United States Patent
Plumat et al.

[15] 3,645,710
[45] Feb. 29, 1972

[54] DIFFUSION TREATMENTS OF SELECTED BODY SURFACE PORTIONS BY ELECTRIC ARC

[72] Inventors: Emile Plumat, Gilly; Lucien F. Leger, Montigny le Tilleul, both of Belgium

[73] Assignee: Glaverbel S.A., Watermael Boistfort, Belgium

[22] Filed: Apr. 18, 1968

[21] Appl. No.: 722,390

[30] Foreign Application Priority Data

Apr. 25, 1967 Luxembourg............................53,513
Aug. 30, 1967 Luxembourg............................54,401
Feb. 6, 1968 Great Britain...........................5839/68

[52] U.S. Cl............................65/30, 65/32, 65/33, 65/60, 65/115, 117/93.4, 117/124 B, 204/1, 204/120, 204/164, 204/312, 204/192, 317/3
[51] Int. Cl..................C03c 15/00, C03c 29/00, C22d 1/18
[58] Field of Search..................65/30, 32, 33, 60; 117/93.4, 117/124; 204/1, 120, 164, 312, 192; 118/621; 317/3

[56] References Cited

UNITED STATES PATENTS

| 207,077 | 8/1878 | Shirley | 65/30 |
|---|---|---|---|
| 2,662,833 | 12/1953 | Helmuth | 65/30 X |
| 3,125,457 | 3/1964 | Meister | 117/93.4 X |
| 1,917,271 | 8/1933 | Potter | 204/192 |
| 2,239,642 | 4/1941 | Burkhardt et al. | 204/192 |
| 3,450,581 | 6/1969 | Shortes | 204/192 X |

FOREIGN PATENTS OR APPLICATIONS

| 234,454 | 7/1961 | Australia | 117/93.4 |
| 679,262 | 4/1966 | Belgium | 65/30 |

*Primary Examiner*—Frank W. Miga
*Attorney*—Spencer & Kaye

[57] ABSTRACT

Method and apparatus for the controlled diffusion of ions from a gaseous medium into selected surface portions of a body by contacting such portions with a gaseous diffusion substance at least one element of which represents a source of the ions which are diffused into the material, and maintaining such element in an ionized state in the immediate vicinity of such portions for permitting such ions to diffuse into the body surface.

14 Claims, 4 Drawing Figures

PATENTED FEB 29 1972

3,645,710

INVENTORS.
Emile Plumat
Lucien Leger

BY Spencer & Kaye
ATTORNEYS.

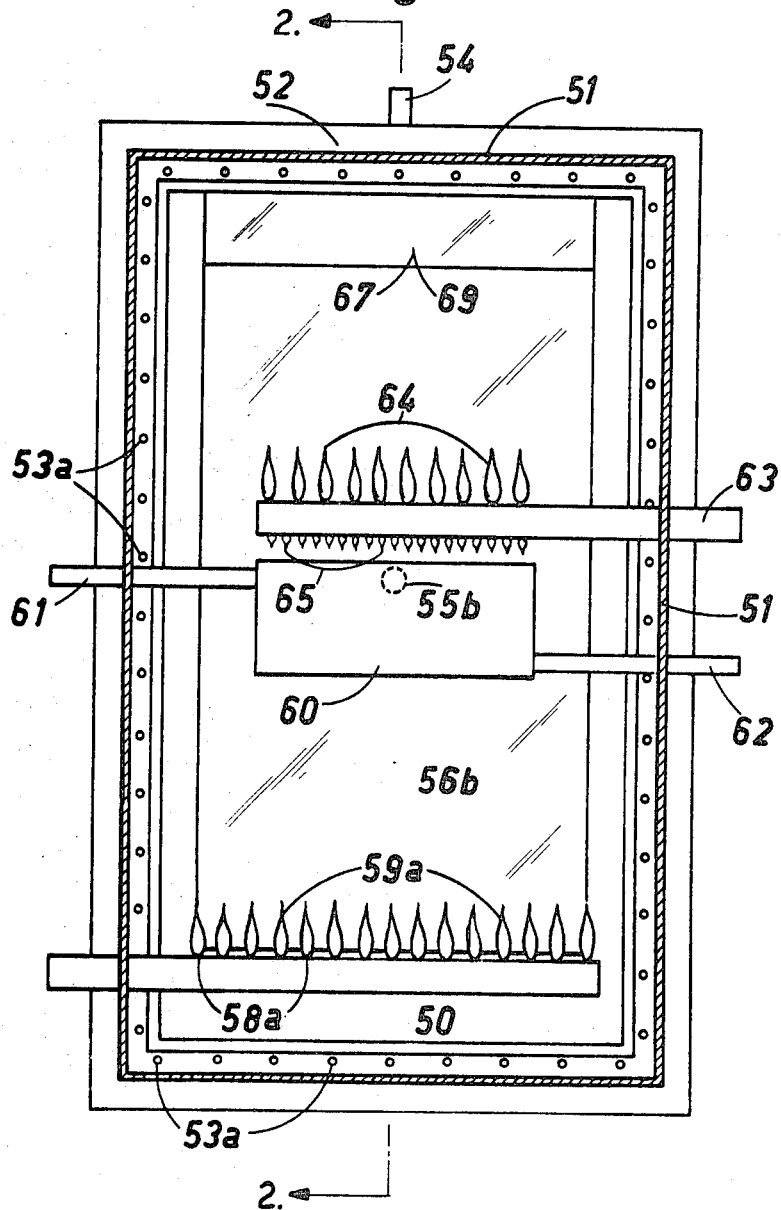

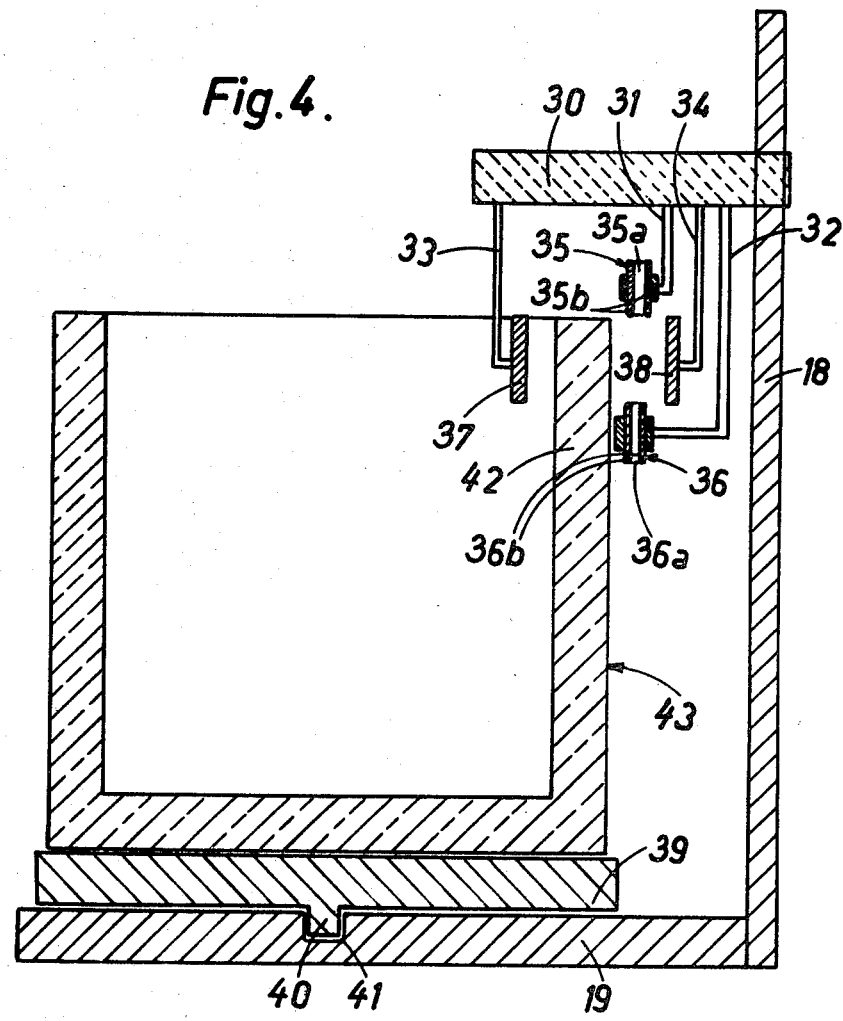

DIFFUSION TREATMENTS OF SELECTED BODY SURFACE PORTIONS BY ELECTRIC ARC

BACKGROUND OF THE INVENTION

The present invention relates to processes and apparatus for modifying a property of solid materials by diffusion, and particularly by ion exchange or ion migration.

The invention is primarily concerned with the treatment of glass so that in the following description reference will primarily be made to this material. However, the treatment of other materials is not to be considered as excluded since the invention can be very usefully applied for modifying properties of other materials, particularly vitrocrystalline materials.

It is known to modify the properties of glass by causing ions to migrate, or diffuse, into the glass from a contacting gaseous medium. Depending on the nature of the ions entering the glass and the prevailing temperature and other conditions, the diffusion causes the glass to be modified in one or more respects, for example in color, in regard to its resistance to chemical change under the action of various agents, or in regard to its mechanical properties.

A particular example of these techniques is the so-called chemical tempering process which involves an exchange of ions between the gaseous medium and the glass, resulting in the production of or increase in compressive stresses in exterior layers of the glass. According to one chemical tempering process, an ion exchange is carried out at a temperature which is sufficiently high for stress relaxation to occur in the glass and the ions entering the glass are such as to confer a lower coefficient of thermal expansion on the surface layers of the glass. According to another of these processes, ions in the surface layers of the glass are replaced by larger ions and the ion exchange is effectuated at a temperature below the annealing point of the glass (corresponding to a viscosity of $10^{13.2}$ poises) so that substantial stress relaxation will not occur.

SUMMARY OF THE INVENTION

It is a primary object of the present invention to achieve a more accurate control of such processes.

Another object of the invention is to carry out these processes only at selected surface regions of an article.

Yet another object of the invention is to perform such diffusion processes to different degrees at different surface regions of the article in an accurately controlled manner.

Still another object of the invention is to rapidly vary the rate at which such diffusion processes occur at any given instant.

These and other objects according to the invention are achieved by a process for modifying a property of the material of a body, which process is carried out by contacting at least a selected portion of the body surface with a gaseous diffusion substance having at least one ingredient whose ions are capable of diffusing into the material, and maintaining such ingredients in an ionized state in the immediate vicinity of such portion of the surface for permitting such ions to diffuse into the body surface.

Thus, according to the present invention, a property of a body of glass or other material is modified by contacting the body with a gaseous substance while the gas is being ionized or maintained in an ionized state wholly or in part in the immediate vicinity of the body, and by causing, or allowing, ions of such substance to enter the body.

The invention can utilize both processes in which ions enter the body in exchange for other ions (substitution processes) and processes in which ions enter the body under the influence of an electric field without any accompanying diffusion of ions from the body. For example, embodiments of the invention can employ chemical glass-tempering processes involving the exchange of alkali metal ions between the glass and the contacting medium or processes wherein the resistance of the glass to chemical corrosion is increased by the introduction of calcium ions, or processes in which the luster, or some other optical property, of glass is enhanced by the introduction of ions of lead or some other metal.

A variety of ionized substances can be introduced into glass, or certain other materials, by processes according to the invention. Specific examples of substances which can be so introduced, other than alkali metals, calcium and lead, which have already been mentioned, are: magnesium, barium, tin, iron, manganese, nickel, cobalt, copper and selenium.

The gaseous substance may be placed in an ionized state by an electrical discharge forming an arc, and it is possible to then maintain the substance in the ionized state wholly or in part by means of a glow discharge and/or one or more flames.

The invention also includes apparatus for effecting a modification of a property of the material of an article by diffusion, the apparatus including means for supporting the article, supply means for delivering into communication with at least a selected surface portion of the article a gaseous diffusion substance having at least one ingredient whose ions are to diffuse into the material, and ionization means disposed adjacent the location of such selected surface portion for maintaining such ingredient in an ionized state.

The ionizing means may be composed of at least one pair of electrodes between which an electric discharge can be established. As has already been stated, ions for diffusing into the article may derive from an element of at least one such electrode. The means for supplying ionized or ionizable gas into the path of the electrical discharge, referred to in the foregoing definition of apparatus, may therefore constitute part of at least one electrode.

The ionizing means may also be constituted by a burner delivering a flame.

The means for supporting the article may be displaceable for moving a supported object during its treatment and/or the electrodes or the burners may be mounted on a displaceable carrier or carriers to permit the electrical discharge or the flames to sweep successive zones of the article.

The apparatus may include auxiliary electrodes for maintaining an electric field through the article during its treatment, thereby to cause or influence the diffusion of ions into the article.

The article support means and the ionizing means may be disposed in a chamber which may be capable of being sealed and evacuated preparatory to treatment of the article therein. According to an important embodiment of the invention, however, the article support means and electrodes and/or the burners are provided in the drawing chamber or tower of a glass-drawing machine, for example a machine of the Pittsburgh or of the Libbey-Owens type.

Apparatus according to the invention may also include means for locally cooling an article during treatment, such as one or more cooling bodies and/or means for supplying cooling gas, for example inert gas, to the article, and/or the apparatus may include one or more gas burners so that during treatment an article can be exposed to one or more flames for accomplishing certain desirable results.

BRIEF DESCRIPTION OF THE DRAWINGS

FIG. 3 is a cross-sectional, elevational view taken along the line 3—3 of FIG. 2.

FIG. 4 is a cross-sectional, elevational view of an apparatus according to the invention for tinting the rims of glass vessels.

DESCRIPTION OF THE PREFERRED EMBODIMENT

Figure 1:
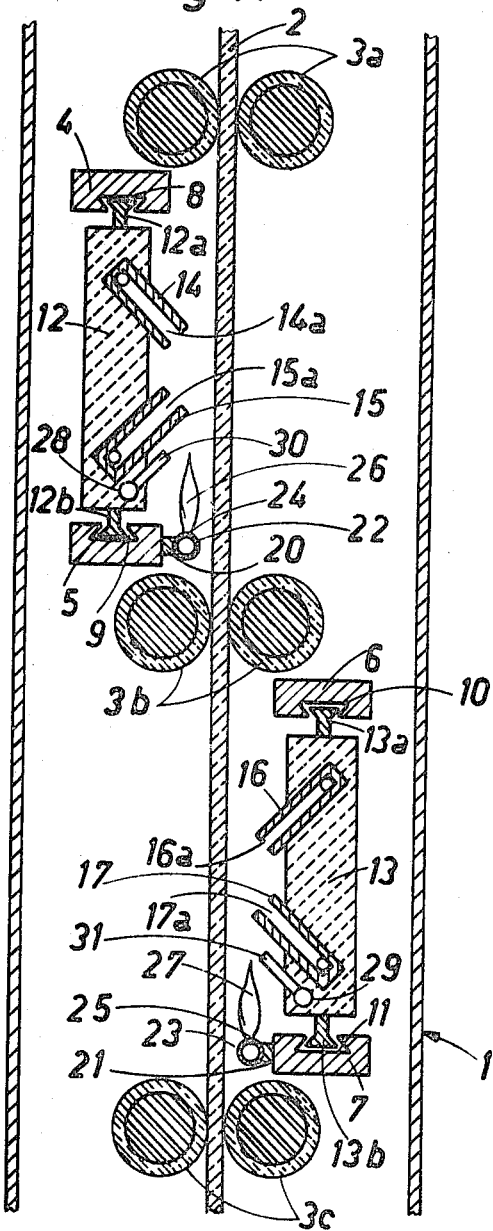
FIG. 1 is a vertical, cross-sectional, elevational view of part of a glass-drawing machine equipped with apparatus according to the invention.

FIG. 1 shows a portion of a machine for drawing glass in accordance with the Pittsburgh process. The drawing shows part of the vertical drawing column 1 of such a machine, inside which column there are pairs of rollers 3a, 3b and 3c which, together with other rollers not shown, draw a ribbon of glass 2 upwardly in a vertical direction from a drawing chamber. The glass ribbon is, by way of example, of the order of 3 meters in width. Pairs of horizontal guide rails 4, 5 and 6, 7 are disposed at respectively opposite sides of the vertical path followed by the glass ribbon. The guide rails are formed with grooves, or guideways, 8, 9, 10 and 11, respectively, which grooves form guideways for carriages 12 and 13 made of electrically insulating refractory material and provided with respective slide portions 12a, 12b and 13a, 13b, each of which engages in a respective guideway.

The carriage 12 carries two hollow metal electrodes 14 and 15 inclined at right angles to one another, the center lines of the electrodes intersecting in the plane of the glass ribbon 2. The carriage also contains a passage 28 extending perpendicular to the plane of the drawing, and a series of pipes 30 communicating with passage 28 and spaced therealong.

The carriage 13 holds similar hollow metal electrodes 16 and 17 which are similarly inclined and similarly disposed relative to the plane of the glass ribbon. Each electrode is open toward the ribbon. This carriage also has a passage 29 and feed pipes 31 similar to those of carriage 12.

Feed pipes are connected to the electrodes and communicate with their hollow interiors 14a, 15a, 16a and 17a so that the gaseous substance to be ionized can be fed from the feed pipes and through the hollow electrodes into the regions between each pair of electrodes.

Each pair of electrodes is connected across an alternating electric current source producing a voltage of 100 volts at a frequency of 50 Hz. and during one exemplary glass-drawing process, in which the glass might be drawn at a speed of 90 meters per hour for example, an electric arc 10 cm. in height, this being equal to the spacing between the electrodes, and 30 cm. in width, the width being measured perpendicular to the plane of the drawing and being substantially equal to the width of the electrodes of each pair. The current intensity is 3 amperes. Each carriage is caused to travel along its guiderails at such a rate as to travel the length of the rails and back once every 7 seconds, this movement being across the width of the glass ribbon, by any suitable, well-known driving means, which are not shown. The temperature of the atmosphere surrounding the ribbon 2 ranges from 700° C. at the level of rollers 3c to 600° C. at the level of rollers 3a. Vapors of lithium nitrate ($LiNO_3$) are fed to the electrodes so as to be discharged into the electric arcs.

Brackets 20 and 21 on rails 5 and 7, respectively, support burner tubes 22 and 23, respectively, which are fed from locations outside column 1 with combustible gas and which have a series of burner orifices 24 and 25, respectively, spaced along the tops of the tubes at intervals of 1 cm. The outermost orifices of each series are inset from the corresponding edges of the glass ribbon by a distance of 6 cm. so that the flames 26 and 27 formed by the ignition of the burner jets extend across the ribbon to about 6 cm. from each of its side edges.

When it is also desired to diffuse hydrogen ions into the glass, hydrogen vapor is fed into passages 28 and 29 in the carriages 12 and 13 via refractory steel tubes (not shown) which are coaxial with the passages and which move to-and-fro as a unit with the carriages. The hydrogen vapor is discharged adjacent the flames through the series of pipes 30, which are spaced at intervals of 12 mm. along the width of carriage 12, and through the series of pipes 31 disposed in the same way along carriage 13. Each of the pipes 30 and 31 has an internal diameter of 5 mm. The hydrogen is ionized by the flame so that it can also diffuse into the glass in the region of the arc. The hydrogen is supplied when it is desired to take advantage of the known beneficial effects of diffusing ions thereof into a material.

The electric arcs are stabilized by reactances (not shown) in order to effect a control of the quantity of heat given off by the electric arcs. In the concentrated heat of the arcs the lithium nitrate discharged from the electrodes is maintained in an ionized state in contact with the surfaces of the glass. Under the then prevailing conditions, sodium ions in the glass become replaced by lithium ions.

When the burners are ignited, the heat energy given off by each of the resulting flames 26 and 27 is the equivalent of the order of 50 watts and under those conditions the current intensity of the arcs can be reduced to 1.2 amperes without loss of stability, either in space or time. At the same time, hydrogen vapors are supplied to the immediate vicinity of the flames from the pipes 30 and 31.

The ribbon has marginal strips 6 cm wide which are not toughened, or tempered, and this permits edge portions of the ribbon to be easily cut from the cooled ribbon after leaving the drawing column.

It has been found that in a process as described, the lithium concentration gradient, and therefore the compressive stress gradient in the external layers of the glass, is not as steep as in glass tempered by a comparison process which differs from the described process only in that the comparison process does not employ burning gas at the burner tubes 22 and 23. In the described process the concentration of lithium at the surfaces of the treated ribbon is not more than half of the concentration resulting from the comparison process (without flames), and the deepest penetration of the lithium in the described process is greater, by about 20 microns, than in the comparison process. The described process also results in a low concentration gradient of hydrogen protons of ions from the surface of the glass to a depth of 1 millimeter. However, it is not essential to use flames of any kind in the practice of the invention and if the apparatus shown in FIG. 1 were not provided with gas burners, it would still lie within the scope of the present invention.

The glass ribbon tempered according to the described process can be readily scored for cutting and can be cut up into sheets. It has been found that, in the event of breakage, the tempered glass spontaneously divides into small noncutting fragments.

Figure 2:
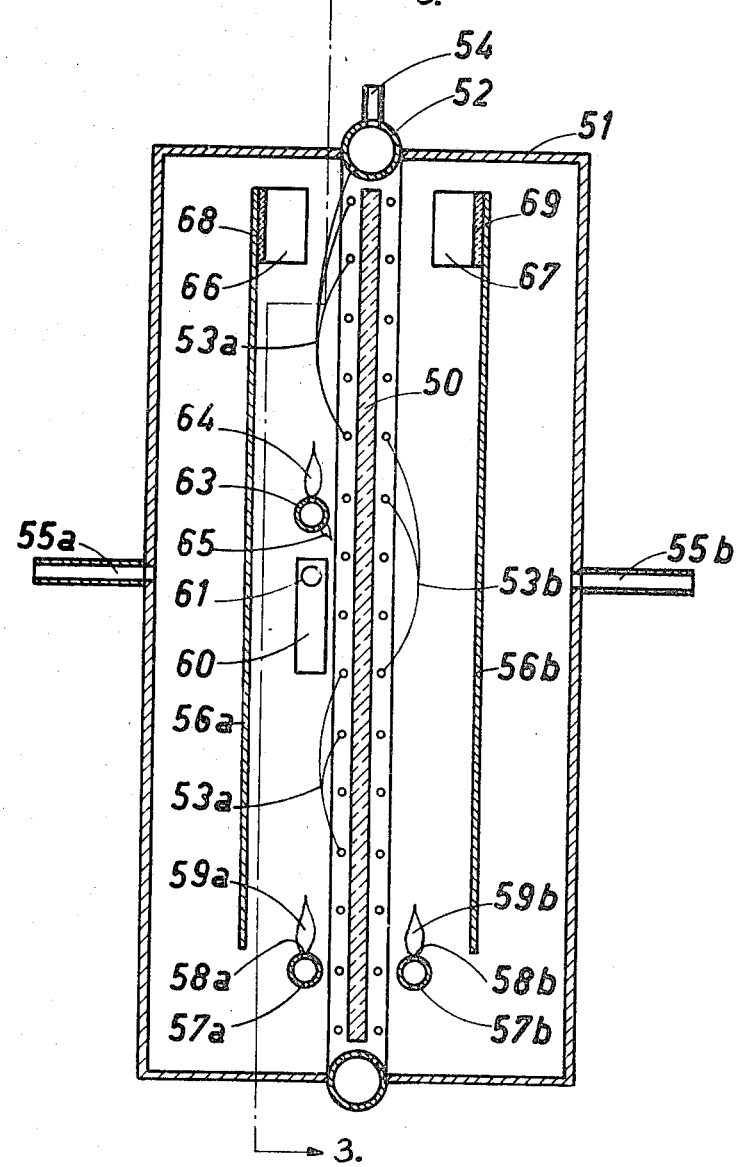
FIG. 2 is a cross-sectional, elevational view, along the line 2—2 of FIG. 3, of apparatus according to the invention for chemically tempering glass sheets.

Referring now to the apparatus shown in FIGS. 2 and 3, a sheet of glass 50, which is, for example 70 cm. × 90 cm. × 0.5 cm. in size, is supported, by any suitable known means (not shown), in a closed box 51 and within a rectangular frame formed by a tube 52 in which there are two series of regularly spaced apertures 53a and 53b on respectively opposite sides of the plane of the glass sheet. The tube 52 is fed, for example, at a rate of 50 liters per minute, via an inlet 54, with relatively cool air (180° C.) and $KNO_3$ vapor. The air is continuously drawn off from the box through pipes 55a and 55b.

plate electrodes 56a and 56b are connected across an alternating current source producing a voltage of 220 volts at a frequency of 50 Hz. to establish and maintain an electric field between the electrodes, i.e., through the glass sheet. This field activates the diffusion of the potassium ions into the glass. During the process the glass sheet is maintained at a temperature of 400°C.

Flames 59a and 59b are produced by the burning of combustible gas at the orifices 58a and 58b of burners 57a and 57b, respectively. Cold water is circulated, via delivery and discharge conduits 61 and 62, respectively, through a cooler 60 disposed adjacent the central portion of the glass sheet. Further combustible gas is fed to a burner tube 63 which is situated above the cooler 60 and which has two series of burner orifices from which flames 64 and 65 issue, as shown. Cold water is also circulated, via suitable pipes (not shown), through cooling boxes 66 and 67 attached to electrically insulating plates 68 and 69 which are in turn mounted on the electrodes 56a and 56b, respectively.

The air containing $KNO_3$ vapor at 180° C. is only slightly ionized, if at all, when it leaves the apertures 53a and 53b of tube 52. However, the potassium nitrate is strongly ionized as soon as it reaches the flames 59a, 59b, 64 and 65.

The gaseous medium passing between the cooler 60 and the glass sheet is deionized so that the toughening, or tempering, effect across this zone of the sheet is practically nil. The cooler can be spaced further away from the sheet, in which case it would be advisable to provide screens to confine the cooling radiation to the required central zone of the glass sheet. The coolers 66 and 67 cause a similar deionization of the gaseous medium at the upper region of the glass sheet, thus preventing any short-circuit arcs from occurring between the electrodes along paths extending over the top edge of the sheet. Similar short-circuiting past the vertical edges of the sheet 50 has not been found to occur in practice, but if in any particular process there were any tendency for such short-circuiting to occur, it could be prevented by placing similar cooling elements opposite the vertical edges of the sheet 50 or by increasing the amount of air introduced into the box from the vertical portions of the peripheral tube 52.

In the actual practice of the described process, a sheet of glass was treated in the box 51 for a period of 10 minutes. Upon removal from the box, the sheet was gradually cooled and after cooling was found to be in a toughened, or tempered, state. Potassium ions were detected to a depth of 35 microns save at the marginal and central portions where the gaseous medium was affected by the coolers 66, 67 and 60. At the marginal portions the potassium ions had penetrated only 2–3 microns, while the depth of penetration at the central zone of the sheet, opposite the cooler 60, was 5 microns. When there were imposed on the sheet sufficient forces to break it, the most highly tempered glass portions, surrounding the central zone, first fractured along lines outlining pieces of a given size and then, after a few seconds, such pieces spontaneously divided into small noncutting fragments.

Referring now to FIG. 4, there is shown an apparatus including an upright 18 which is attached to a horizontal metal plate 19 and which carries a horizontal arm 30. The arm 30 can be secured at any adjusted height along the upright. Four rigid electrically conductive members 31, 32, 33 and 34 are attached to the horizontal arm 30, which is itself of electrically nonconductive material. The conductors 31 and 32 carry two principal, vertically spaced electrodes 35 and 36, and the conductors 33 and 34 carry two horizontally spaced auxiliary electrodes 37 and 38.

The principal electrodes 35 and 36 are composed of core pieces 35a and 36a, respectively, containing, initially in solid form, a substance which volatilizes so as to provide the ions which are to be diffused into the body to be treated, the electrodes also including conductive sheathings 35b and 36b, respectively, supporting their associated core pieces. The auxiliary electrodes 37 and 38 are in the form of arcuate metal plates disposed in horizontally spaced relationship transverse to the vertical plane containing the axes of the principal electrodes. A turntable 39 is rotatably mounted on the metal plate 19 by way of a bearing constituted by a pivot pin 40 seated in a recess 41.

The apparatus is shown in use for conferring a decorative effect on the rim portion 42 of a glass vessel 43. The vessel 43 is placed on the turntable 39 and the horizontal arm 30 is set at a height such that the tops of the auxiliary electrodes 37 and 38 are on a level with the rim of the vessel. A high-frequency alternating voltage is applied between the principal electrodes 35 and 36 to produce an electric arc. This arc is stabilized in a well-known manner by means of a suitable reactance (not shown) to regulate the quantity of heat released by the arc. The substance which is to be diffused into the glass is emitted from the cores 35a and 36a in ionized form.

A suitable direct-current voltage is applied between the auxiliary electrodes 37 and 38 to produce an electric field across the rim portion of the vessel. The turntable is kept in rotation and the rim portion of the vessel is rapidly heated, for example by means of suitably placed burners (not shown). A controlled concentration of the ions to be diffused into the rim portion of the vessel is maintained adjacent this rim portion, and a controlled exchange of ions takes place. The speed of rotation of the turntable 29 and the value of the direct current voltage applied to the auxiliary electrodes are adjusted so that a uniform tinting of the rim portion of the vessel is achieved.

By way of example, a uniform red coloration of the rim portion of a vessel can be achieved by using copper electrode cores and causing liberated copper ions to replace alkali metal ions in the external layers of the glass at the rim portion of the vessel.

One advantage of the present invention is that given results can be achieved much more rapidly than was heretofore possible. Another advantage is that the degree to which the body under treatment is heated and the quantity of ions entering the body can be very easily controlled. Moreover, the diffusion effects can be localized at a predetermined position or positions of the body and/or can be caused to vary from one position to another.

To cite one specific example, a sheet of glass can be chemically tempered selectively by confining the influence of the electrical discharge and/or the flame to one or more parts of the sheet, or it can be tempered differentially from one treatment zone to another. Such differential tempering can be achieved by varying the length of the discharge path and/or the position of the electrodes in relation to the article and/or the electrical potential, in the case of an electrical discharge, or, in the case of a flame, by varying the fuel flow or the length of the flame from one treatment zone to another.

Differential tempering is advantageous for many purposes. For example, in the production of vehicle windshields, it is desirable for one or more vision zones to be tempered to a lesser extent than other zones, this being primarily for reasons of safety since highly tempered glass totally loses its transparency when fractured.

To cite another example, a glass article such as a hollowware article can be differentially tinted for decorative purposes by causing suitable metal ions to migrate into the glass, under the influence of an electrostatic field, the ions emanating from a substance maintained in an ionized state by an electric arc or a flame which can be controlled so as to vary its influence in any desired manner from one treatment zone to another. Such control can be effected so as to periodically ignite and extinguish the arc or flame so as to create an intermittent ionization and hence an intermittent diffusion action.

Ions can be caused to diffuse simultaneously into two or more different zones of an article by establishing two or more flames or electrical discharges.

The invention can be carried out while a continuous or intermittent relative movement occurs, during processing, between the body undergoing treatment and the ionizing electrical discharge or flame. It is therefore possible, for example, to treat a continuously manufactured ribbon of glass during the course of its travel from the ribbon-forming zone. The speed of such relative movement at any given time influences the extent to which the zone or zones of the body undergoing treatment is or are affected by the diffusion process.

A substance whose ions are to be introduced into the body of glass or other material can be supplied to the vicinity of the discharge or flame in ionized form. For example, an ionized substance can be fed through a hollow electrode or through a separate supply tube, as shown in FIG. 1, or the electrode or electrodes can be formed of, or include, for example in the form of a solid core, a substance which vaporizes so as to provide the requisite ions, as shown in FIG. 4. Alternatively, or additionally, a substance whose ions are to be introduced into the body can be delivered to the vicinity of the electric discharge or flame in a nonionized, or only partly ionized, state. The nonionized or partly ionized substance can likewise be fed through a hollow electrode or a separate feed passage.

An electric field may be established, as shown in FIGS. 2—4, to cause, or to influence, the entry of ions into the body undergoing treatment, for example to increase the rate of entry of such ions, and when such an electric field is used, it affords an additional means for controlling the treatment.

The quantity of ions entering the body under treatment during a given period of time is dependent, inter alia, on the temperature of the body and it is possible to produce a predetermined differential effect within the zone of influence of the electric discharge or flame by subjecting one or more surface portions of the body, within this zone of influence, to the action of cooling means, such as a cooler through which a coolant is circulated or a stream of nonionized cooling gas. The degree of cooling to which the surface portions can be subjected depends on the resistance which the body exhibits to thermal shocks, but the degree of cooling must be sufficient to inhibit or restrict the diffusion of ions into the body across the surface portions in question.

If a cooling body is used and is located opposite a particular surface portion of the body during the diffusion treatment, the treated body will have an untreated, or at most weakly treated, zone whose location and size correspond with the location and size of the cooler. This procedure is therefore very suitable for chemically tempering a sheet of glass to form a windshield having a vision safety zone.

It is also possible to combine the action of a cooling body with the action of cooling gases. Thus, when chemically tempering a windshield while using a cooling body as described above to preserve an untempered or relatively weakly tempered vision safety zone, cooling gases may be blown against the sheet in such a way as to produce a graduated tempering which increases outwardly from such zone towards the screen periphery.

A differentiated tempering can be achieved by blowing an inert gas, such as nitrogen, against a portion or portions of the treated body. Alternatively, use can be made of a rare gas which ionizes only to a small extent outside the field of the electric discharge or flame but which forms a rich source of ions when it enters that field. This phenomenon can, for example, be made use of for tempering a windshield so as to leave one or more vision safety zones where the glass is tempered less than in surrounding areas.

If a cooling action is employed, as in the embodiment of FIGS. 2 and 3, it can be made intermittent during the process. In this way a differential tempering effect can be achieved in a process in which ions are allowed, or caused, to diffuse continuously into a continuously advancing ribbon of glass. Thus, by intermittently exerting a cooling action on the ribbon substantially along a transverse line past which the ribbon travels, spaced untempered or weakly tempered zones can be caused to appear in the formed ribbon and the ribbon can be easily cut at these zones to separate it into sheets. This effect can be produced by means of a cooling body which is made intermittently effective for predetermined periods of time, or by intermittently supplying a nonionized cooling gas to one or more predetermined locations along the ribbon path.

According to another optional but very advantageous feature of the invention, when the ionization is produced or maintained primarily by an electric discharge, as in the apparatus of FIG. 1, this discharge is supplemented by one or more flames located in, or adjacent, the path of the discharge. A flame so placed helps to maintain the gas in the discharge path in an ionized state. This feature is of value in permitting a stable electric arc to be maintained at a lower voltage, with a consequential lowering of the arc intensity and reduced risk of pitting of the surfaces of the body undergoing treatment.

Moreover, the presence of a flame tends to make the ion concentration more uniform and a flame also contributes toward heating the body, promotes penetration of ions into the body, and causes the diffusion front within the treated body to tend to be shallower. The diffusion front is that portion of the ion penetration gradient curve, as established for example, by an electronic sonde, or probe, which shows a rather sharp drop at a certain depth below that surface through which the ions enter the body. This penetration curve is of special significance in the chemical tempering of glass. A steep diffusion front indicates a correspondingly steep gradient in the compressive stress distribution depthwise from the glass surface and a very steep gradient confers breakage characteristics on the glass which, for certain purposes, such as vehicle windshield manufacuture, are not satisfactory.

The ionizable substance can be fed directly to the vicinity of the flame or flames and if ions are also introduced elsewhere, for example by volatilization of an electrode, the substance which is fed to the flame can be selected to provide the same or different ions.

When allowing, or causing, ions to diffuse into a surface or surfaces which are disposed vertically or at an inclination to the vertical, each flame is preferably disposed just below the lower boundary of the electrical discharge path. However, this location of the flame or flames is not essential and they can be located within the discharge path or can be directed downwardly from locations just above the upper boundary of such path.

The most effective position is, as shown in FIG. 1, at or near the bottom level of the discharge path at those locations where the hot gases produced by the flame rise and form a screen in contact with the body undergoing treatment. The hot gases will then influence the discharge along the entire vertical extent of its path. Comparable results can be achieved in cases where a horizontal discharge is established between superposed electrodes located to one side of the body.

A flame or flames, when used, can be located so as to influence the electrical discharge nonuniformly across the width of the discharge path. In other words, a flame can also be instrumental in achieving differential effects. For example, when tempering a glass ribbon as it is being drawn, a central zone of the ribbon can be exposed to a series of flames located opposite the ribbon path while one or both of the ribbon side margins are not exposed to flames. The margin or margins not directly exposed to the flames will then be untempered, or tempered to a lesser extent than the rest of the ribbon, depending on the voltage potential of the electrical discharge, and such margins can be easily cut off, in a conventional manner at the completion of the tempering and drawing processes. In the absence of flames, the voltage potential necessary for tempering the central part of the ribbon would have to be higher, with a consequent wasteful electrical discharge adjacent the side edges of the ribbon.

A variety of differential treatment effects can be achieved by appropriate use of flames in conjunction with differential cooling means of the type described above. Thus, when chemically tempering a rectangular glass sheet disposed vertically and exposed to rising currents of hot gas produced by flames, as shown in FIGS. 2 and 3, tempering of the four marginal zones of the sheet can be restricted by exposing these margins to nonionized cooling gas streams and/or to cooling bodies during the tempering process. The cooling effect along the upper margin of the sheet can prevent arcs from forming above the top edge of the sheet under the influence of a diffusion-activating electric field passing through the sheet, which arcs might otherwise occur under the influence of the rising hot gases.

The invention can be applied for modifying a body of glass or other material forming a coating on another body. For example an article coated with a layer of a liquid material, for example a molten salt, or bearing a solid coating layer, for example a titanium or other metal layer, may be treated according to the invention by causing an ion exchange to take place between the layer and the surrounding gaseous medium, and an ion exchange can also be caused to take place between the coating layer and the coated article.

It will be understood that the above description of the present invention is susceptible to various modifications, changes and adaptations, and the same are intended to be comprehended within the meaning and range of equivalents of the appended claims.

We claim:

1. A process for modifying a property of the material of at least one surface of a body of a material having at least one vitreous phase, comprising: contacting at least a selected portion of the body surface with a gaseous substance whose ions are capable of diffusing into the material; at least partly ionizing such substance by subjecting it, in the immediate vicinity of such surface portion, to an electric arc discharge of sufficient energy to ionize the substance, the discharge being located entirely to that side of the body at which such surface is disposed and following a trajectory which extends substantially parallel to the surface at least in the region where it is nearest the surface; and maintaining such substance in an ionized state in the immediate vicinity of such portion of the surface under conditions which cause such ions to diffuse into the body surface.

2. A process as defined in claim 1 wherein said step of maintaining is carried out at least in part by providing a flame adjacent such surface portion.

3. A process as defined in claim 1 wherein said step of contacting is carried out by supplying a substance which is initially in an ionized state.

4. A process as defined in claim 3 wherein the electric arc discharge is formed between a pair of electrodes and wherein said step of ionizing is carried out by the vaporization of an element of at least one of the electrodes under the influence of the discharge occurring between the electrodes.

5. A process as defined in claim 1 wherein said step of ionizing is carried out by ionizing the substance adjacent only a portion of the body surface and continuously varying the location of that portion adjacent which the substance is ionized.

6. A process as defined in claim 1 comprising the further step of establishing an electrostatic field through the article surface for promoting the diffusion of ions into the material.

7. A process as defined in claim 1 wherein said step of ionizing is further carried out by providing at least one supplementary ionizing flame in the vicinity of such discharge.

8. A process as defined in claim 7 wherein the surface portions into which diffusion takes place are inclined with respect to the horizontal, the electric arc discharge extends substantially parallel to such surface portion, and the flame is located in the vicinity of the lower extremity of such discharge.

9. A process as defined in claim 7 wherein the flame is arranged so as to differentially influence the ionization of the substance at different locations across the width of the electric discharge.

10. A process as defined in claim 1 comprising the further step of reducing the concentration of ions adjacent a part of such selected body surface portion.

11. A process as defined in claim 10 wherein said step of reducing the ion concentration is carried out by passing a stream of a gas which remains in a nonionized state adjacent such part.

12. A process as defined in claim 10 wherein said step of reducing the ion concentration is carried out by cooling such part with the aid of a cooling body disposed adjacent thereto.

13. A process as defined in claim 1 wherein the material is glass, the ions which diffuse into the body surface are alkali metal ions, and the diffusion process is accompanied by the diffusion of other alkali metal ions out of the glass.

14. A process as defined in claim 1 wherein the ingredient whose ions are to diffuse into the material are selected from the group consisting of calcium, magnesium, barium, lead, tin, iron, manganese, nickel, cobalt, copper and selenium.

* * * * *

UNITED STATES PATENT OFFICE
CERTIFICATE OF CORRECTION

Patent No. 3,645,710     Dated February 29th, 1972

Inventor(s) Emile Plumat and Lucien F. Leger

It is certified that error appears in the above-identified patent and that said Letters Patent are hereby corrected as shown below:

In the heading of the patent, after line 13, insert
--Mar. 26, 1968  Australia..........35,533/68--.
Column 4, line 24, after "protons" change "of" to --or--;
line 46, change "plate" to --Plate--.

Signed and sealed this 22nd day of August 1972.

(SEAL)
Attest:

EDWARD M. FLETCHER, JR.　　　　　　ROBERT GOTTSCHALK
Attesting Officer　　　　　　　　　　Commissioner of Patents